United States Patent [19]

Ishihara

[11] Patent Number: 5,431,014
[45] Date of Patent: Jul. 11, 1995

[54] MASTER CYLINDER

[75] Inventor: Kimio Ishihara, Higashimatsuyama, Japan

[73] Assignee: Jidosha Kiki Co., Ltd., Tokyo, Japan

[21] Appl. No.: 219,363

[22] Filed: Mar. 29, 1994

[30] Foreign Application Priority Data

Apr. 23, 1993 [JP] Japan .................................. 5-097409

[51] Int. Cl.$^6$ ............................................. B60T 11/20
[52] U.S. Cl. ........................................ 60/562; 92/171.1
[58] Field of Search ................. 60/561, 562; 92/170.1, 92/171.1

[56] References Cited

U.S. PATENT DOCUMENTS

| | | | |
|---|---|---|---|
| 4,249,381 | 2/1981 | Gaiser | 92/171.1 |
| 4,527,395 | 7/1985 | Gaiser et al. | 92/171.1 |
| 4,945,729 | 8/1990 | Hayashida et al. | 92/171.1 |

FOREIGN PATENT DOCUMENTS 2-147363 12/1990 Japan .
5-41969 10/1993 Japan .

*Primary Examiner*—F. Daniel Lopez
*Attorney, Agent, or Firm*—Jacobson, Price, Holman & Stern

[57] ABSTRACT

A master cylinder having a sleeve that will not deform due to the difference in fluid pressures caused by the operation of the brake and a construction having dimensions that can be easily controlled. The master cylinder comprises a cylinder housing comprising a body and a cap, pistons received in the cap and disposed slidably in the cylinder housing, and piston guides, at least one of said guides in the form of a sleeve having a slit extending the entire length of the sleeve in a direction parallel to the piston axis and further having a passage communicating with an outside fluid passage.

5 Claims, 3 Drawing Sheets

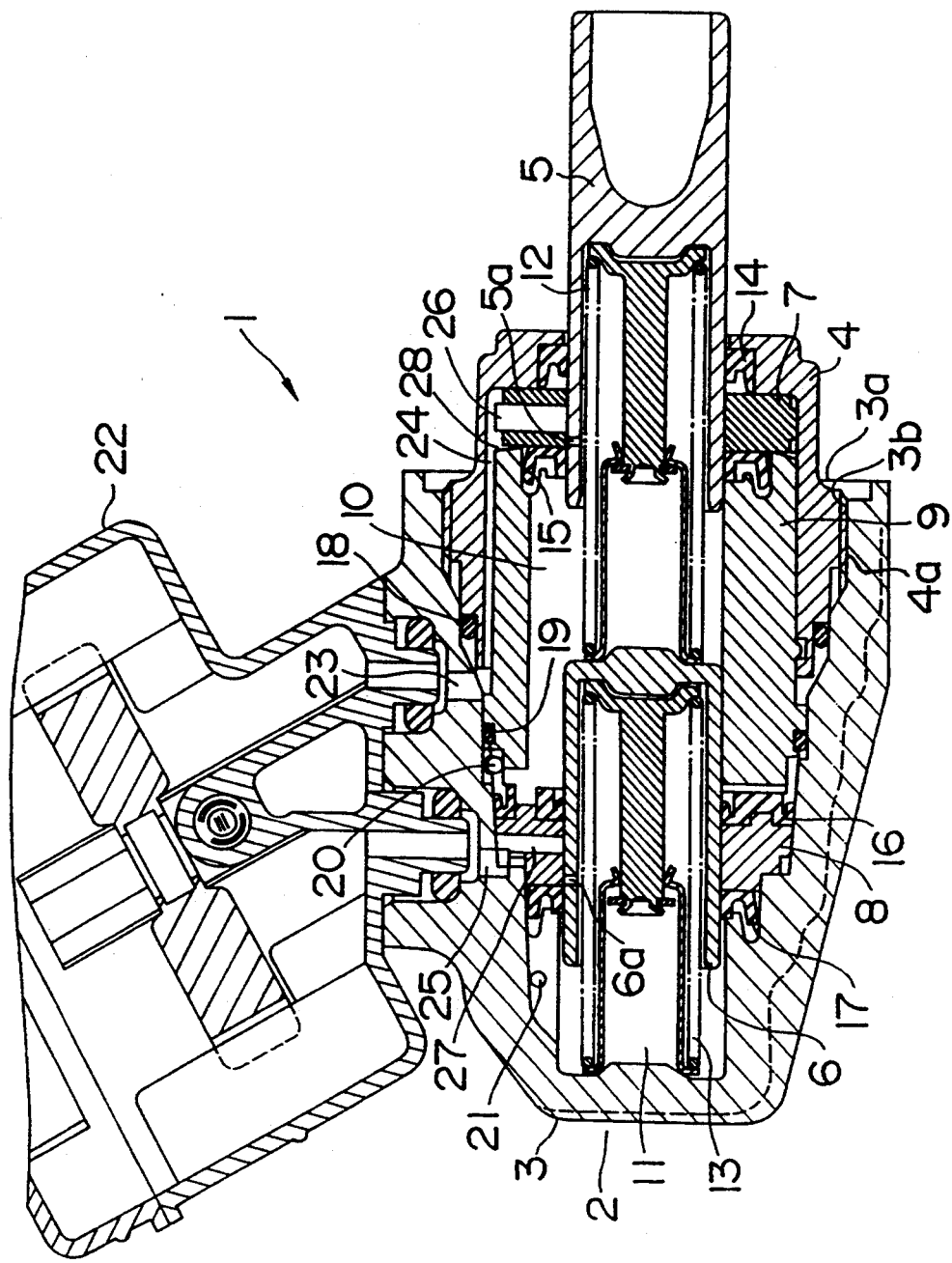

MASTER CYLINDER

FIELD OF THE INVENTION AND RELATED ART STATEMENT

The present invention relates to a master cylinder used for various brake devices of motor vehicles.

Conventionally, a tandem master cylinder, for example, shown in FIG. 4 is known in the art as a master cylinder of this type. This master cylinder 1 has a cylinder housing 2 which comprises a body 3 made of, for example, aluminum alloy, which has an opening at one end thereof, and a cap 4 made of the same.

The body 3 has an opening 3a at one end thereof, and internal threads 3b is formed on the inner peripheral surface of the opening 3a. On the outer peripheral surface of the cap 4 at one end is formed external threads 4a. The cap 4 is mounted in the body 3 by engaging the external threads 4a of the cap 4 with the internal threads 3b of the body 3.

Within the body 3, the tip portion of a primary piston 5 and the whole of a secondary piston 6 are slidably disposed via piston guides 7 and 8, with the cap 4 being inserted. Also, within the body 3, a first pressure chamber 10 is defined by the primary piston 5 and a resin sleeve 9 for positioning the piston 5, whereas a second pressure chamber 11 is defined by the secondary piston 6 and the inside wall surface of the body 3.

Spring mechanisms 12 and 13 are disposed in the first pressure chamber 10 and the second pressure chamber 11, respectively, and annular seal members 14, 15, 16, 17, 18, and 19 are disposed in the cylinder housing 2.

The master cylinder 1 of this type is so constructed that when the primary piston 5 and the secondary piston 6 are pushed into the first pressure chamber 10 and the second pressure chamber 11, respectively, to the left in the figure, the fluid pressures in the pressure chambers 10 and 11 increase, so that the hydraulic fluids are sent under pressure from delivery ports 20 and 21 to a not illustrated brake system.

With the master cylinder 1, the primary piston 5 and the secondary piston 6 are inserted and guided by the sleeve 9 positioned in the cylinder housing 2 and the piston guides 7 and 8. The piston guides 7 and 8 have passages 26 and 27 connected to make-up fluid passage 23, 24, and 25 running from an oil reservoir 22, respectively.

In the first pressure chamber 10 on the primary piston 5 side, a fluid supply groove 28, which functions when brake is released, is formed on the side of the sleeve 9 on the piston guide 7 side. One end of the fluid supply groove 28 is open to the seal member 15 side, and the other end thereof communicates with the make-up fluid passage 24. The opening of the fluid supply groove 28 is formed into a tapered shape, with the opening area being small at the inside of the sleeve 9 and large at the outside.

This prevents the corner of the seal member 15 from entering the fluid supply groove 28 when the fluid pressure in the first pressure chamber 10 increases upon the operation of brake, and the seal member 15 is pressed against the end of the sleeve 9 and the left wall of the piston guide 7 for sealing. A small hole 5a, which is formed at the side of the primary piston 5, defines a make-up fluid passage from the oil reservoir 22 to the first pressure chamber 10 at the position of brake release.

However, during the brake operation, in which the primary piston 5 moves to the left in the figure, only the pressure on the inside diameter portion side of the sleeve 9 of the first pressure chamber 10 increases, but the pressure in the make-up fluid passage 24 on the outside diameter portion side of the sleeve 9 and in the peripheral gap is always low, so that a pressure difference is produced between the inside and outside diameter portions. Therefore, the sleeve 9, which is made of resin, expands so as to fill the peripheral gap, so that the shape and dimensions of the sleeve 9 change.

On the other hand, the sleeve 9, which is made of resin and deformed by pressure, must be subjected to control in terms of the dimensions of its portions when the sleeve 9 is manufactured as a part, and particularly severe control is required over the inside diameter portion of the sleeve 9, on which the primary piston 5 slides. Therefore, the cost becomes high.

SUMMARY OF THE INVENTION

The present invention was made to solve the above problems. Accordingly, an object of the present invention is to provide a master cylinder having a sleeve that will not deform, due to the difference in fluid pressure caused by the operation of the brake a construction having dimensions that can be easily controlled.

To achieve the above object, the master cylinder comprising a cylinder housing composed of a body having an opening at one end thereof and a cap for closing the opening by being connected to the body, pistons inserted into the cap and disposed slidably in the cylinder housing, and piston guides, at least one guide in the form of a sleeve having a passage communicating with an outside fluid passage, is constituted as follows:

(1) The sleeve is provided with a slit extending a total length of a sleeve in the piston axis direction, and the sleeve is installed in contact with the cylinder housing while being radially compressed to decrease the width of the slit.

(2) The slit formed in the sleeve is parallel to a piston axis direction.

(3) A piston guide portion is integrally formed as a portion of the cap, in place of the piston guide, to slidably insert a primary piston, and a passage, which communicates with an outside fluid passage formed in the cap, is formed in the piston guide portion.

In the master cylinder according to one aspect of the present invention and as described above, the pressure of the outside diameter portion side of the sleeve becomes equal to the pressure of the inside diameter portion side (the portion which guides the pistons) simultaneously when the brake is operated, so that no pressure difference is produced between the inside and outside diameter portions of the sleeve. Therefore, the sleeve is not deformed.

The sleeve's dimension can be controlled by the height of the protrusions installed on the sleeve, providing the inside diameter portion, thus determining the dimensions of the inside and outside diameter portions, so that the dimensional accuracy is enhanced compared to conventional sleeves.

As seen from the above description, the master cylinder of the present invention has the following effects: by providing a slit, extending a total length of the sleeve in the piston axis direction, such that when the sleeve is installed in the cylinder housing the sleeve can be compressed radially by thus preventing the width of the slit, the pressure of the outside diameter portion of the sleeve becomes equal to the pressure of the inside diameter portion simultaneously when brake is operated, so that no pressure difference is produced between the inside and outside diameter portions, thus preventing deformation of the sleeve.

The sleeve's dimension can be controlled by the height of protrusions installed on the sleeve providing the inside diameter portion, thus determining the dimensions of the inside and outside diameter portions, so that the dimensional accuracy is enhanced compared with conventional sleeves. Therefore, changing the dimensions of the sleeve is easy to perform, and is cost effective.

BRIEF DESCRIPTION OF THE DRAWINGS

In the drawings,

FIG. 4 is a sectional view of a conventional master cylinder.

DETAILED DESCRIPTION OF A PREFERRED EMBODIMENT

A preferred embodiment of the present invention will be described in detail in an exemplary way with reference to the drawings.

Figure 1:
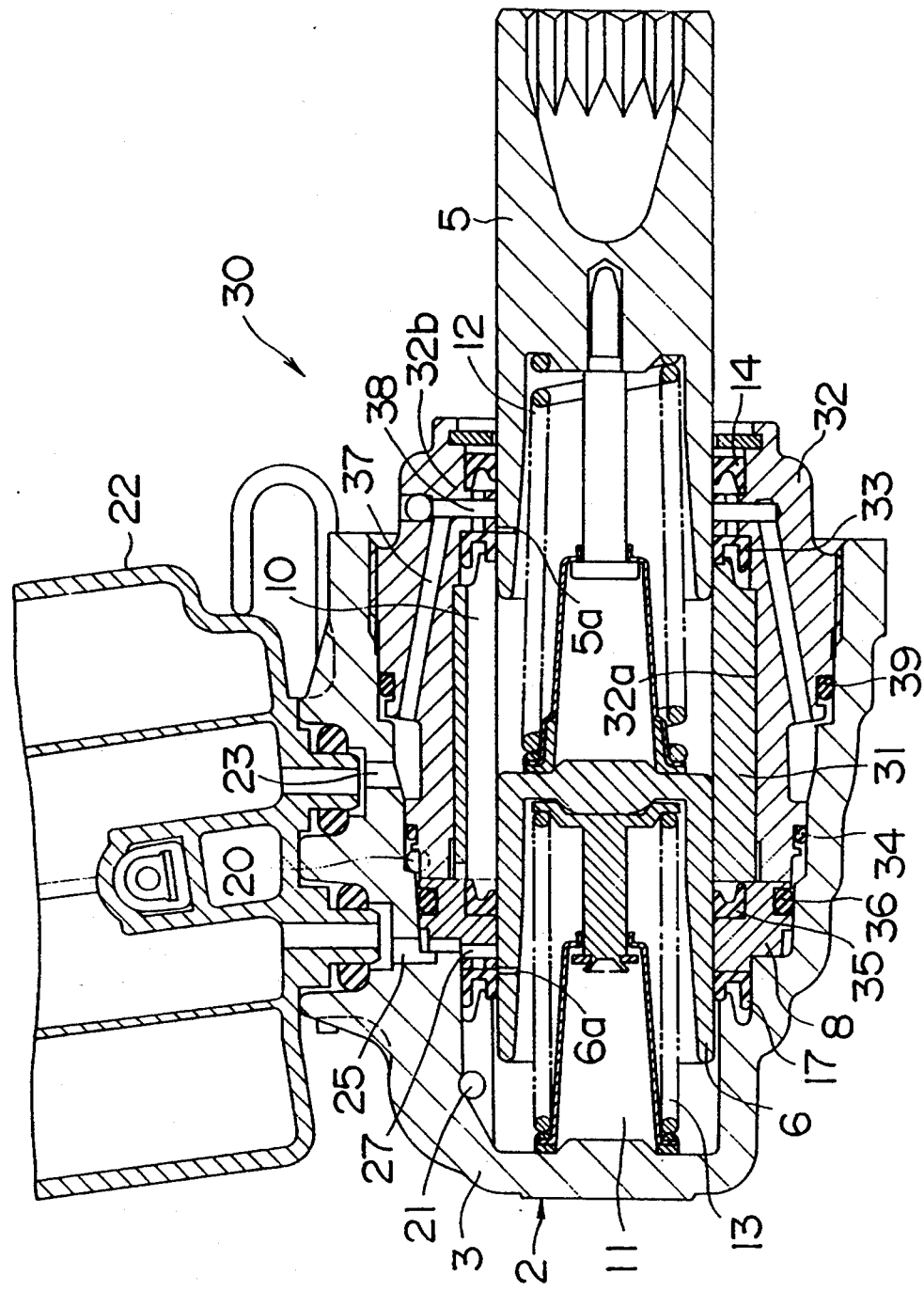
FIG. 1 is a sectional view of one embodiment of the master cylinder in accordance with the present invention.
Figure 2:
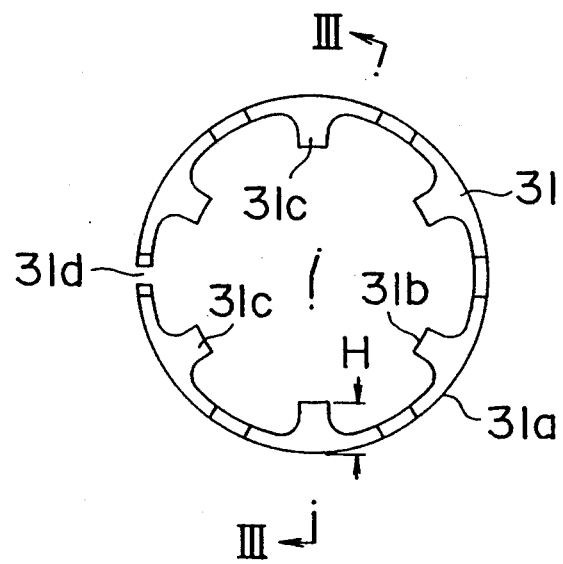
FIG. 2 is a side view of a sleeve, viewed along the line II—II of FIG. 3.
Figure 3:
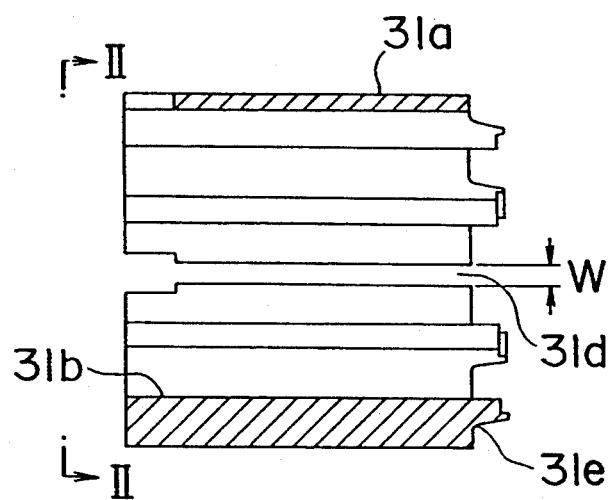
FIG. 3 is a sectional view taken along the line III—III of FIG. 2.

FIGS. 1 to 3 show one embodiment of the master cylinder of the present invention. The same reference numerals are applied to elements shown in these figures which are the same or substantially same as the elements shown in FIG. 4, and the explanation of these elements is omitted.

In FIG. 1, a master cylinder 30 is so constructed that a resin sleeve 31 for positioning is disposed in contact with the inner peripheral surface 32a of a cap 32 in a first pressure chamber 10 defined by a primary piston 5, a secondary piston 6, and a piston guide 8 as well as a body 3 and the cap 32 which compose a cylinder housing 2.

The sleeve 31 is a cylindrical member having an outside diameter portion 31a which is in contact with the inner peripheral surface 32a of the cap 32 and an inside diameter portion 31b for guiding the primary piston 5. The inside diameter portion 31b has a plurality of protrusions 31c formed by a plurality of grooves formed in parallel to the piston axis direction. Therefore, the top end surfaces of the protrusions 31c form the inside diameter portion 31b.

The sleeve 31 is provided with one slit 31d of width W over the total length of the sleeve 31 in the piston axis direction and in parallel to the piston axis. When the sleeve 31 is installed on the inner peripheral surface 32a of the cap 32, the sleeve 31 is inserted and assembled into the cap 32 while being radially compressed to decrease width W of the sleeve 31d. After insertion, the sleeve 31 comes in contact with the inner peripheral surface 32a of the cap 32 by the elastic force of the sleeve 32 itself. In a free state, the outside diameter portion 31a of the resin sleeve 31 has an outside diameter slightly larger than the inside diameter of the inner peripheral surface 32a of the cap 32.

A concave portion 31e formed at the end of the sleeve 31 defines a space for accommodating the deformation of the seal member 33 to form a fluid supply passage when brake is released.

To hermetically seal the first pressure chamber 10, annular seal members 33, 34, 35, and 36 are disposed between the cap 32 and the primary piston 5, between the cap 32 and the body 3, and near the piston guide 8, respectively, to provide sealing against the low pressure of the outside.

At a portion 32b of the cap 32, a piston guide portion is formed integrally, in place of the conventional piston guide 7, to slidably insert the primary piston 5. Make-up fluid passages 37 and 38, which connect an oil reservoir 22 to the piston guide portion 32b via a make-up fluid passage 23 in the body 3, is formed in the cap 32. Reference numeral 39 denotes an annular seal member.

With the master cylinder 30, when a not illustrated brake pedal is depressed to apply brake, a pressing force is applied to the primary piston 5, and accordingly the primary piston 5 and the secondary piston 6 are moved under pressure to the left in FIG. 1.

When the primary piston 5 is moved under pressure to the left, the communication between the small hole 5a and the make-up fluid passage 38 is cut off by the seal member 33, so that the fluid pressure in the first pressure chamber 10 is increased.

At this time, since the first pressure chamber 10 is sealed by the annular seal members 33, 34, 35, and 36, the pressure on the outside diameter portion 31a side of the sleeve 31 becomes equal to the pressure in the first pressure chamber 10 simultaneously through the slit 31d, so that no pressure difference is produced between the inside diameter portion 31b side and the outside diameter portion 31a side of the sleeve 31 in the first pressure chamber 10. Therefore, the sleeve 31 is not expanded or otherwise deformed at all.

For this reason, the sleeve 31 can be formed so as to have a thin wall.

The outside diameter portion 31a of the sleeve 31 is in contact with the inner peripheral surface 32a of the cap 32 and the inside diameter portion 31b guides the primary piston 5. Therefore, only the dimension between the inside and outside diameter portions 31b and 31a, that is, the height H of the protrusions 31c, must be subjected to control in terms of dimensions. For this reason, the sleeve 31 can be manufactured at a low cost and can be assembled to the cap 32 very easily as compared with the conventional sleeve.

The technology of the present invention is not limited to that in the above embodiment, and any means of another aspect for performing the same function may be used. Various changes and additions can be made on the technology of the present invention within the scope of the above constitution.

What is claimed is:

1. A master cylinder comprising a cylinder housing composed of a body having an opening at one end thereof and a cap for closing said opening by connecting to said body; primary and secondary pistons inserted into said cap and disposed slidably in said cylinder housing; and a sleeve having a passage communicating with an outside fluid passage;

wherein said sleeve, which guides at least said primary piston, is provided with a slit extending a total length of said sleeve, and said sleeve is installed in contact with said cylinder housing while being radially compressed to decrease the width of said slit.

2. The master cylinder according to claim 1 wherein said slit formed in said sleeve is parallel to a piston axis direction.

3. The master cylinder according to claim 1 further comprising
 a piston guide portion, integrally formed as a portion of said cap, to slidably receive the primary piston, said piston guide portion having a passage which communicates with an outside fluid passage formed in said cap.

4. The master cylinder according to claim 1 further comprising
 a piston guide for guiding said secondary piston.

5. The master cylinder according to claim 1 wherein said sleeve is substantially cylindrical and comprises an inner diameter portion formed by a plurality of inwardly extending protrusions.

* * * * *